United States Patent
Muff et al.

(10) Patent No.: US 8,935,694 B2
(45) Date of Patent: Jan. 13, 2015

(54) SYSTEM AND METHOD FOR SELECTIVELY SAVING AND RESTORING STATE OF BRANCH PREDICTION LOGIC THROUGH SEPARATE HYPERVISOR-MODE AND GUEST-MODE AND/OR USER-MODE INSTRUCTIONS

(75) Inventors: Adam J. Muff, Rochester, MN (US); Paul E. Schardt, Rochester, MN (US); Robert A. Shearer, Rochester, MN (US); Matthew R. Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 13/355,884

(22) Filed: Jan. 23, 2012

(65) Prior Publication Data

US 2013/0191825 A1 Jul. 25, 2013

(51) Int. Cl.
*G06F 9/455* (2006.01)
*G06F 9/30* (2006.01)
*G06F 9/38* (2006.01)

(52) U.S. Cl.
CPC ............... *G06F 9/30* (2013.01); *G06F 9/3844* (2013.01)
USPC .......................................................... 718/1

(58) Field of Classification Search
CPC ............. G06F 9/30; G06F 9/38; G06F 9/466; G06F 9/30087; G06F 9/3861; G06F 9/3844; G06F 9/30058; G06F 12/0862; G06F 9/45533
USPC .......................................................... 718/1
See application file for complete search history.

(56) References Cited

U.S. PATENT DOCUMENTS

| | | | |
|---|---|---|---|
| 4,679,141 A | 7/1987 | Pomerene et al. | |
| 5,228,131 A | 7/1993 | Ueda et al. | |
| 5,606,715 A | 2/1997 | Yishay et al. | |
| 5,935,241 A | 8/1999 | Shiell et al. | |
| 5,949,995 A | 9/1999 | Freeman | |
| 6,108,775 A | 8/2000 | Shiell et al. | |
| 6,108,776 A | 8/2000 | Check et al. | |
| 6,223,280 B1 | 4/2001 | Horton et al. | |
| 6,574,712 B1 | 6/2003 | Kahle et al. | |

(Continued)

FOREIGN PATENT DOCUMENTS

| | | |
|---|---|---|
| EP | 0218335 A2 | 4/1987 |
| WO | 2006041758 A1 | 4/2006 |

OTHER PUBLICATIONS

U.S. Patent Application entitled, "Virtualization Support for Branch Prediction Logic Enable/Disable" filed by Adam J. Muff on Jan. 23, 2012.

(Continued)

*Primary Examiner* — Mohammed Rehman
*Assistant Examiner* — Xuxing Chen
(74) *Attorney, Agent, or Firm* — Wood, Herron & Evans, LLP

(57) ABSTRACT

A hypervisor and one or more programs, e.g., guest operating systems and/or user processes or applications hosted by the hypervisor to configured to selectively save and restore the state of branch prediction logic through separate hypervisor-mode and guest-mode and/or user-mode instructions. By doing so, different branch prediction strategies may be employed for different operating systems and user applications hosted thereby to provide finer grained optimization of the branch prediction logic.

23 Claims, 9 Drawing Sheets

(56) References Cited

U.S. PATENT DOCUMENTS

| | | |
|---|---|---|
| 6,877,089 B2 | 4/2005 | Sinharoy |
| 7,849,298 B2 | 12/2010 | Arimilli et al. |
| 2005/0149710 A1 | 7/2005 | Hikichi |
| 2008/0114971 A1 | 5/2008 | Fontenot et al. |
| 2010/0169693 A1* | 7/2010 | Mukherjee et al. ........... 713/375 |

OTHER PUBLICATIONS

International Search Report and Written Opinion of the ISA dated May 14, 2013—International Application No. PCT/IB2013/050029.

* cited by examiner

SYSTEM AND METHOD FOR SELECTIVELY SAVING AND RESTORING STATE OF BRANCH PREDICTION LOGIC THROUGH SEPARATE HYPERVISOR-MODE AND GUEST-MODE AND/OR USER-MODE INSTRUCTIONS

FIELD OF THE INVENTION

The invention is generally related to data processing, and in particular to processor architectures and branch prediction logic utilized therein.

BACKGROUND OF THE INVENTION

As semiconductor technology continues to inch closer to practical limitations in terms of increases in clock speed, architects are increasingly focusing on parallelism in processor architectures to obtain performance improvements. At the chip level, multiple processing cores are often disposed on the same chip, functioning in much the same manner as separate processor chips, or to some extent, as completely separate computers. In addition, even within cores, parallelism is employed through the use of multiple execution units that are specialized to handle certain types of operations. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

Another area where advances have been made in processor design is that of branch prediction, which attempts to predict, in advance of execution of a conditional branch instruction, whether or not that branch instruction will branch to a different code path or continue along the same code path based upon the result of some comparison performed in association with the branch instruction. Branch prediction may be used, for example, to prefetch instructions from a cache or lower level memory to reduce the latency of loading and executing those instructions when the branch instruction is finally resolved. In addition, in highly pipelined architectures, branch prediction may be used to initiate execution of instructions from a predicted branch before a branch instruction is resolved, such that the results of those instructions can be committed as soon as possible after the branch instruction is resolved.

When a branch is correctly predicted, substantial performance gains may be achieved given that very little latency may exist between executing the branch instruction and the instructions that have been predicted for execution after the branch instruction. On the other hand, when a branch is mispredicted, often the pipeline of an execution has to be flushed and the state of the processor essentially rewound so that the instructions from the correct path can be executed.

As a result, substantial efforts have been made in the art to improve the accuracy of branch predictions and therefore minimize the frequency of branch mispredicts by branch prediction logic. Many branch prediction logic implementations, for example, rely on historical information, and are based upon the assumption that if a branch was taken the last time a branch instruction was executed, a likelihood exists that the branch will be taken the next time that branch instruction is executed. In many implementations, for example, a branch history table is used to store entries associated with particular branch instructions so that when those branch instructions are encountered, a prediction may be made based upon data stored in the associated with such branch instructions.

The implementation of branch prediction logic in a processor, however, presents a number of challenges. For example, improving the accuracy of branch prediction logic often requires the use of more complex logic, which can slow down branch prediction and add to the amount of logic circuitry required to implement the logic. With history-based branch prediction logic, accuracy is often directly proportional to the amount of historical information stored by the logic; however, increasing the storage capacity of a branch history table requires additional logic circuitry. In many applications, there is a desire to minimize the amount of logic circuitry in a processor chip devoted to branch prediction logic, e.g., to reduce power consumption and/or cost, or to free up additional space to implement other functionality.

In addition, it has been found that branch prediction algorithms often don't work well for certain types of program code. Some program code, such as, for example, binary tree searches, exhibit practically random branch characteristics, and a branch decision made during one execution of a branch instruction may provide no insight to what decision will be made the next time the instruction is executed. In addition, in multithreaded environments where multiple threads are concurrently executed in processing core, the limited size of a branch prediction table that is shared by multiple threads can result in historical information being frequently discarded as new branch instructions are encountered, such that the historical information for a particular branch instruction may no longer be in the branch prediction table by the time that branch instruction is later executed.

In fact, it has been found that in some instances branch prediction can actually decrease performance when the percentage of mispredicts rises to a level where the penalties of the mispredicts exceed the latencies that would have otherwise occurred if the processing core waited to resolve branch instructions before attempting to execute the instructions in the proper code path.

Some conventional processor designs have provided an ability to selectively disable branch prediction logic. In addition, some conventional processor designs have provided an ability to save and restore the state of branch prediction logic. History-based branch prediction logic, in particular, tends to improve in accuracy over time as more historical information is collected; however, if multiple independent threads are accessing branch prediction logic with a limited amount of storage, the collection of historical information for one thread may cause historical information for other threads to be discarded. By saving and restoring the state of branch prediction logic, however, the branch prediction logic often can be "primed" for different code sections so that historical information collected for those code sections in the past are more likely to be resident in the branch prediction logic the next time those code sections are executed.

While the ability to selectively disable branch prediction logic and save/restore the state of branch prediction logic can address some of the shortcomings of conventional branch prediction, conventional designs nonetheless are characterized as lacking flexibility to address different situations, particularly in more complex and high performance data processing systems where numerous different types of applications, having vastly different operating characteristics, may be executed on such systems.

For example, many high performance data processing systems utilize virtualization to enable multiple operating systems to be hosted on a common hardware platform under the management of supervisory-level software often referred to as a hypervisor. Each operating system, which runs as a guest of the hypervisor, may in turn host one or more user applications running in separate processes in the operating system environment. A multitude of different applications, running different algorithms with characteristics that are not well suited to generalization from a branch prediction standpoint, may coexist in such a system, making it difficult to provide a branch prediction strategy that works optimally for all scenarios.

Therefore, a significant need continues to exist in the art for a manner of controlling branch prediction logic in a processing core in a flexible and efficient manner.

SUMMARY OF THE INVENTION

The invention addresses these and other problems associated with the prior art by providing virtualization support that permits both a hypervisor and one or more programs, e.g., guest operating systems and/or user processes or applications hosted by the hypervisor to selectively save and restore the state of branch prediction logic through separate hypervisor-mode and guest-mode and/or user-mode instructions. By doing so, different branch prediction strategies may be employed for different operating systems and user applications hosted thereby to provide finer grained optimization of the branch prediction logic.

Consistent with one aspect of the invention, branch prediction logic in a data processing system is controlled by saving a first state of branch prediction logic in the processing core in response to a first, hypervisor-mode instruction executed by the processing core for a hypervisor resident in the data processing system, restoring the first state of the branch prediction logic in response to a second, hypervisor-mode instruction executed by the processing core for the hypervisor, saving a second state of the branch prediction logic in response to a third instruction executed by the processing core for a program hosted by the hypervisor, and restoring the second state of the branch prediction logic in response to a fourth instruction executed by the processing core and hosted by the hypervisor.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
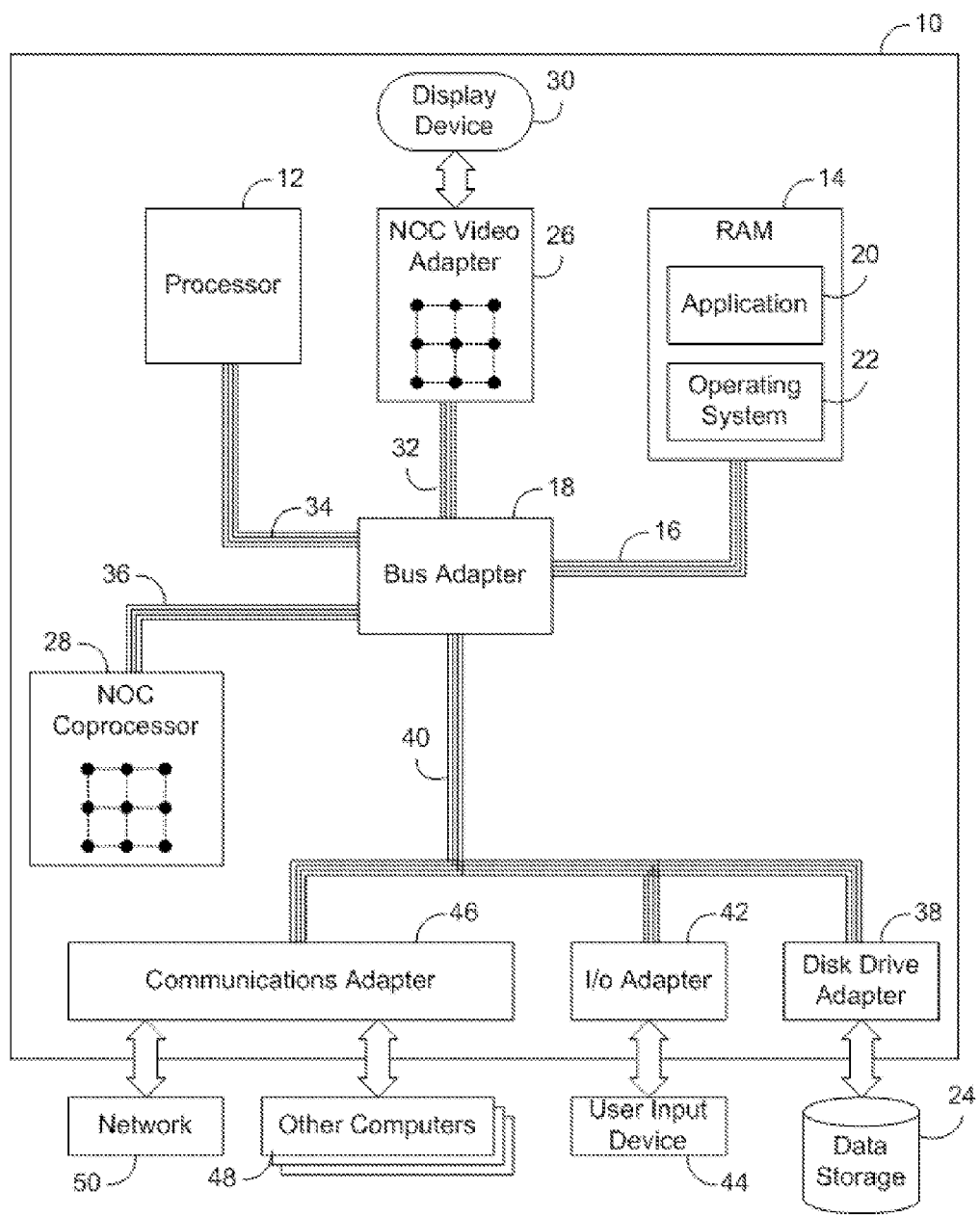
FIG. 1 is a block diagram of exemplary automated computing machinery including an exemplary computer useful in data processing consistent with embodiments of the present invention.

Embodiments consistent with the invention utilize fine grained control of branch prediction logic through multiple levels of a virtualized data processing system to optimize branch prediction for different applications and workloads, thereby improving overall data processing system performance when handling different types of workloads.

In some embodiments, for example, a hypervisor and one or more guest operating systems resident in a data processing system and hosted by the hypervisor are configured to selectively enable or disable branch prediction logic through separate hypervisor-mode and guest-mode instructions. Similarly, in some embodiments, a hypervisor and one or more programs, e.g., guest operating systems and/or user processes or applications hosted by the hypervisor, to selectively save and restore the state of branch prediction logic through separate hypervisor-mode and guest-mode and/or user-mode instructions. By controlling branch prediction logic in one or both of these manners, different branch prediction strategies may be employed for different operating systems and user applications hosted thereby to provide finer grained optimization of the branch prediction logic utilized in the processing cores of a data processing system.

A hypervisor, in this regard, may include any number of supervisory-mode programs that are capable of virtualizing or hosting one or more guest operating systems, and may be implemented in variously levels of software, e.g., firmware, a kernel, etc. A hypervisor typically virtualizes the underlying hardware in a data processing system and presents an interface to the operating systems hosted thereby so that each operating system operates as if it is the sole operating system resident in the physical hardware of the data processing system. A guest operating system is typically an operating system, logical partition, virtual machine or combination thereof that is hosted by an underlying hypervisor, and that supports the execution of one or more user applications running in one or more concurrent processes in the operating system environment. Similar to a hypervisor, a guest operating system essentially virtualizes and allocates hardware resources assigned to the guest operating system to one or more user applications and processes. A user application may in turn be any program capable of running within a process in a guest operating system.

It will be appreciated that in many data processing environments, the processor architectures utilized thereby support different levels of software to execute concurrently thereon, and with different levels of priorities and access rights. In a virtualized environment, hypervisor program code typically runs in a supervisor or hypervisor-mode, while user applications typically run in a lower priority user-mode. Guest operating systems may also run in a supervisor mode or may run in a separate guest-mode that is intermediate the hypervisor and user modes.

It will be appreciated that branch prediction logic may incorporate any number of logic designs with the primary goal of minimizing the latency associated with branch instructions. Many branch prediction logic designs utilize branch history tables, and many may include other logic such as g-share logic, link stack logic, branch target buffers, etc.

As noted above, in some embodiments of the invention branch prediction logic is selectively enabled and disabled by any or all of a hypervisor, guest operating systems and user applications and programs. In this regard, enabling or disabling branch prediction logic may be considered to include enabling or disabling all or only a subset of components implemented in a particular branch prediction logic design. In addition, disabling branch prediction logic may cause a reset of the branch prediction logic, e.g., to clear out entries from a branch prediction table, in some embodiments. In other embodiments, however, disabling branch prediction logic may be analogous to "pausing" the logic, e.g., so that predictions are not made, and historical information is not collected, but that the historical information that has already been collected, and other characteristics of the current state of the branch prediction logic, is maintained until the logic is re-enabled, so that no state or historical information is lost.

As also noted above, in some embodiments of the invention the state of branch prediction logic may be selectively saved and restored on behalf of a hypervisor, a guest operating system and/or a user application or program. The state that may be saved or restored may include any or all of the data maintained in branch prediction logic that characterizes the overall state of the logic, including, for example, branch table entries, branch target buffer data, link stack entries, g-share data, etc.

Other variations and modifications will be apparent to one of ordinary skill in the art. Therefore, the invention is not limited to the specific implementations discussed herein.

Hardware and Software Environment

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™ Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
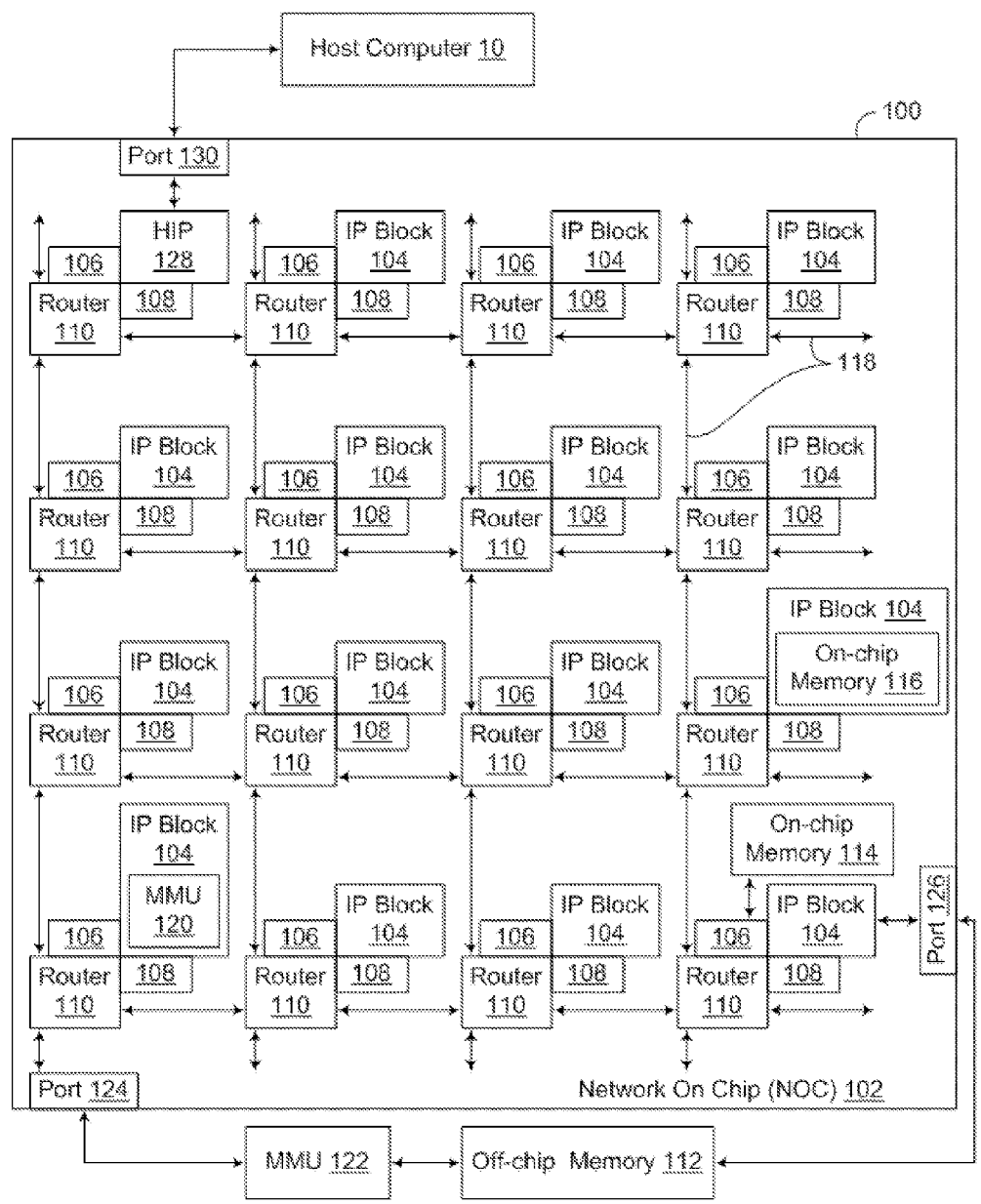
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
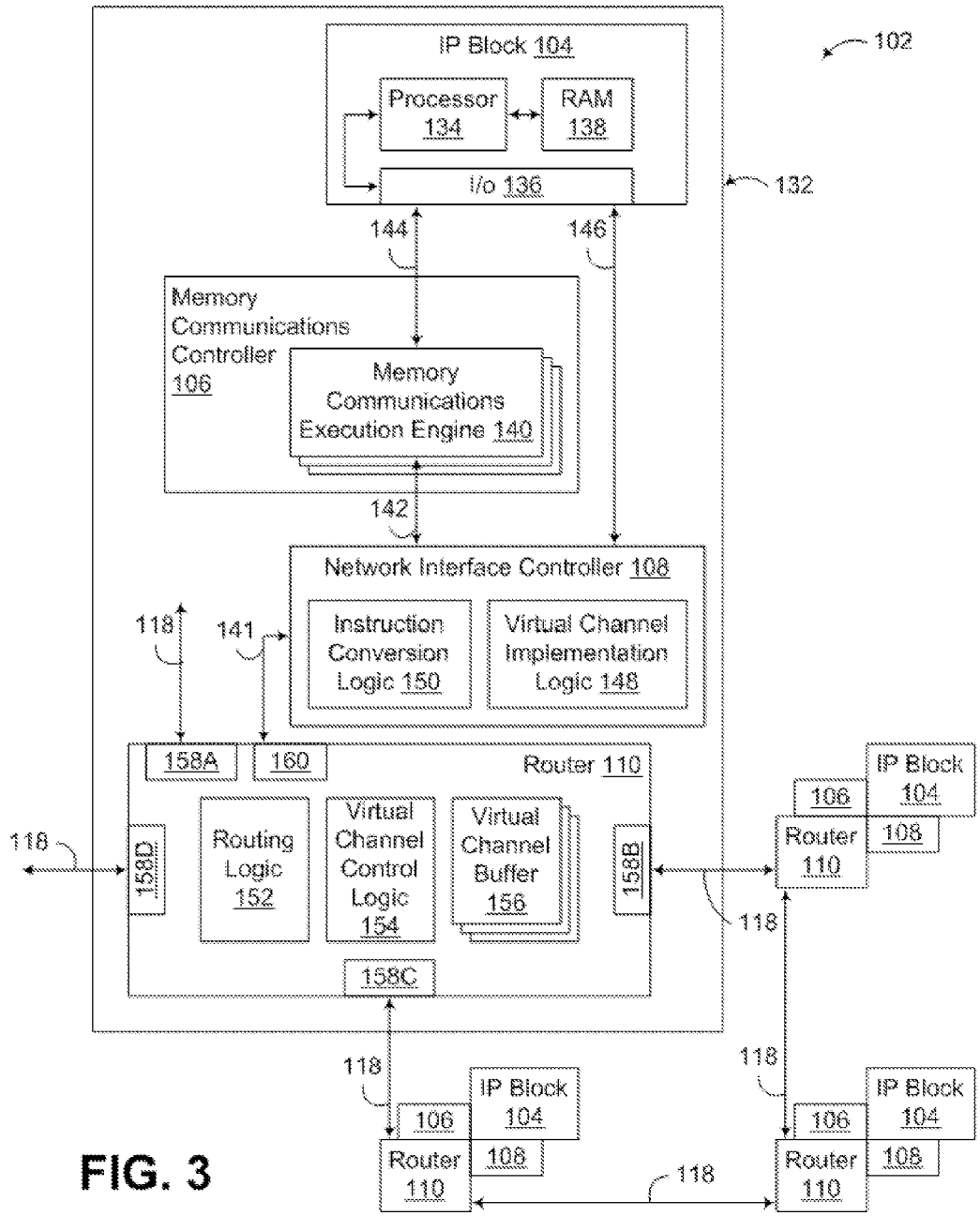
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
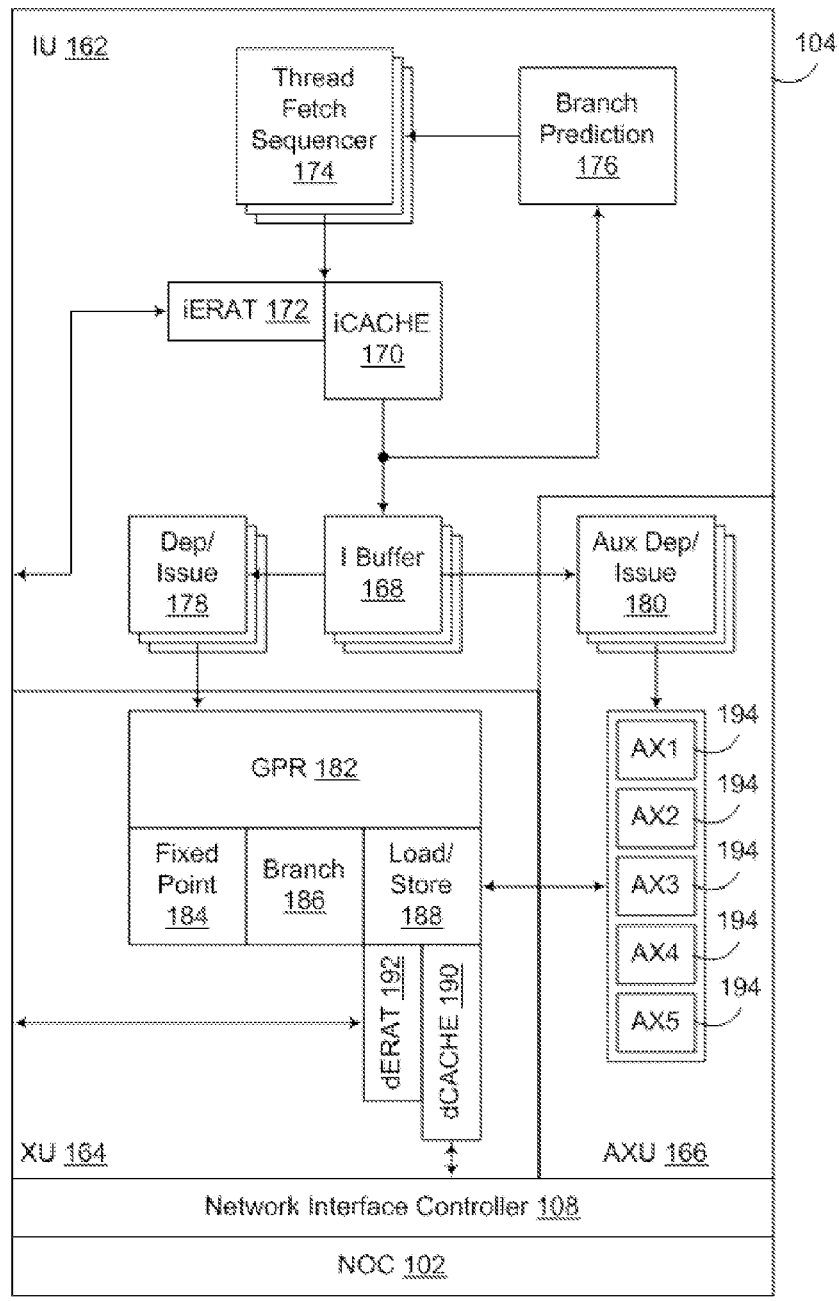
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32*b* or 64*b* PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Virtualization Support for Fine Grained Control of Branch Prediction Logic

Due to the importance of preserving and/or ensuring branch prediction logic data such as branch history table data is capable of providing accurate branch prediction results, embodiments consistent with the invention provide guest-mode and/or user-mode mechanisms to enable and disable branch prediction logic operation that operates in conjunction with hypervisor-mode mechanisms.

Many microprocessor micro-architectures include hardware branch prediction algorithms that are implemented fully or in part by one or more branch history tables. Correct prediction of branch results (taken or not taken) can greatly impact overall CPU performance, especially in an out of order microprocessor. Therefore, it is important to ensure the branch history table contents and other branch prediction information are accurate and representative of future code streams.

Embodiments consistent with the invention extend any mechanisms for hypervisor code to control branch prediction logic operation, e.g., hypervisor accessible control registers that, for example, globally enable and disable branch prediction logic such as branch history tables. In particular, guest-mode mechanisms, for guest operating system hosted by a hypervisor, and optionally user-mode applications and processes, are allowed to control the branch prediction logic as it pertains to the guest operating system's and/or user's own code streams while still allowing a hypervisor to setup global branch prediction operation.

In the embodiments discussed hereinafter, several functionalities may be supported, including, for example, user-mode and/or guest-mode instructions to enable/disable branch prediction logic updates, e.g., branch history table updates; hypervisor-mode and/or guest-mode instructions to enable/disable branch prediction logic updates, e.g., branch history table updates, based on process identifier; hypervisor enable/disable of the guest-mode and/or user-mode instructions to restrict guest operating system and/or user applications from controlling branch protection logic in circumstances under which such control should be deferred; and hypervisor-mode reset of user-mode controls, among other features.

Likewise, due to the importance of preserving and/or ensuring branch prediction logic data such as branch prediction history table data is capable of providing accurate branch prediction results, it is also desirable in some embodiments to provide for a fine grained mechanism to save and restore branch prediction logic state.

Typically, branch prediction logic, e.g., a branch history table, is a shared resource between all hardware threads and all software processes that execute on those hardware threads within a given processing core. This can lead to a problem where the branch history table state thrashes as software processes execute different sets of code. Conventional hardware implementations use hashing algorithms, various branch history table sizes, and other techniques to reduce the impacts of sharing between processes; however, many of these techniques undesirably increase the size and complexity of branch prediction logic In contrast, embodiments consistent with the invention may provide for a fine grained control over saving and restoring the state of branch prediction logic, which can reduce the warm up time for the logic to collect historical information that improves branch prediction accuracy for the various types of software executing in the system. By doing so, a context switch may enable software to execute with a "warmed up" branch history table that is specific to that process. In addition, by saving state data rather than allowing it to be cast out as state data is collected for multiple processes may enable the size and complexity of branch prediction logic to be reduced.

As will be discussed in greater detail below, embodiments consistent with the invention provide instructions that, for example, save and restore the branch history table state information, including hypervisor-mode instructions to save/restore branch prediction logic state to/from memory or other storage medium; guest-mode and/or user-mode instructions to save/restore branch prediction logic state to/from memory; hypervisor-mode enable/disable of guest-mode and/or user-mode save/restore instructions; and hypervisor-mode reset of branch prediction logic state.

Figure 5:
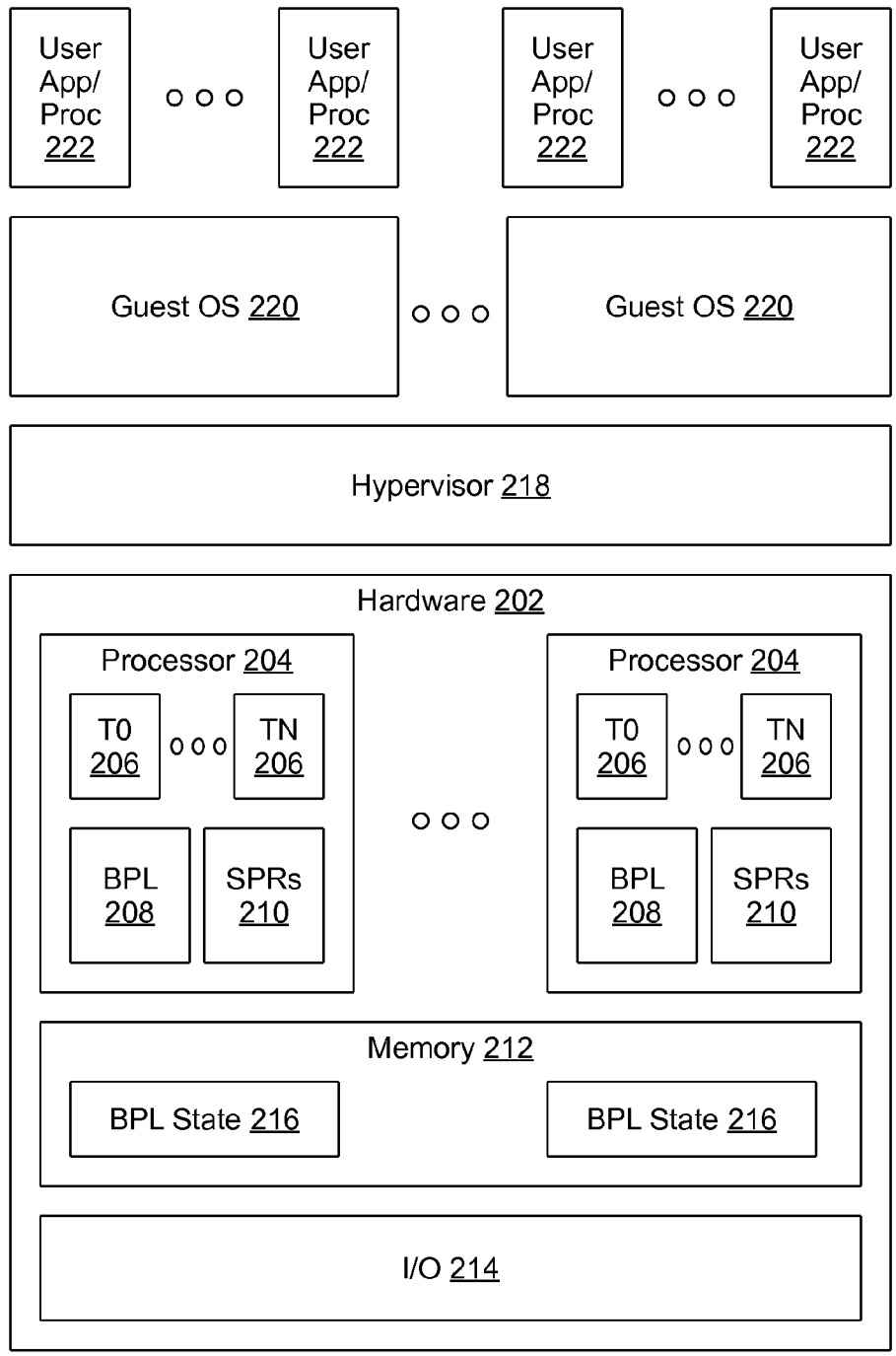
FIG. 5 is a block diagram of a data processing system within which may be implemented virtualization support for fine grained control of branch prediction logic consistent with the invention.

Now turning to FIG. 5, this figure illustrates an exemplary hardware and software environment for a data processing system 200 within which may be implemented virtualization support for fine grained control of branch prediction logic consistent with the invention. From a hardware 202 perspective, data processing system 200 includes a plurality of processors or processing units 204, each including one or more hardware threads 206 supported by branch prediction logic 208 and one or more special purpose registers (SPRs) 210, a memory 214 and an I/O layer 214 coupling the data processing system to various hardware resources, e.g., external networks, storage devices and networks, etc.

In this exemplary embodiment, both selective enablement of branch prediction logic and branch prediction logic state saves/restores are supported. As such, and as will be discussed in greater detail below, one or more control registers, implemented as SPRs, may be used to control both the enable state of branch prediction logic and save/restore operations associated with branch prediction logic state. Furthermore, saved state data 216 may be stored in memory 212 and retrieved in associated with restore operations. It will be appreciated, however, that some data processing systems consistent with the invention may only support selective enablement of branch prediction logic, while others may only support branch prediction logic state saves/restores, so the implementation disclosed herein is not the exclusive manner of implementing the invention.

It will be appreciated that the distribution of hardware threads, branch prediction logic, and processors/processing units may vary in different embodiments. For example, processors 204 may be implemented as processing cores in one or more multi-core processor chips, and each processor 204 may include any number of hardware threads. Furthermore, branch prediction logic may be shared by multiple threads or may be replicated for different threads. In addition, branch prediction logic may be associated with a specific execution unit in a processor or may be processor-wide. In one embodiment, for example, processors 204 may be implemented as IP blocks that are interconnected with one another in a NOC arrangement such as disclosed above in connection with FIGS. 1-4. Therefore, it will be appreciated the invention may be utilized in practically any hardware environment where branch prediction logic is utilized in a processor or processing core, and the invention is therefore not limited to the particular hardware environment disclosed herein.

From a software perspective, data processing system implements a virtualized environment in which a hypervisor 218, also often referred to as a partition manager or virtual machine manager, hosts one or more guest operating systems 220, and provides an interface between guest operating systems 220 and hardware 202 such that guest operating systems 220 are allocated a portion of the hardware resources (e.g., hardware threads, processing cores, processors, memory, I/O functionality, etc.) in the data processing system and such that guest operating systems 220 operate much the same as they would operate in a non-virtualized environment. Each guest operating system 220 hosts one or more user applications or programs 222, which typically operate in independent processes to minimize conflicts between different applications.

Executable instructions associated with hypervisor 218, guest operating systems 220 and user applications 222 are respectively referred to as hypervisor-mode, guest-mode and user-mode instructions, and each processor 204 desirably supports these different instruction modes to selectively restrict the activities of each level of software and control their relative priorities. Hypervisor 218, in particular, is granted the highest priority mode, with decreasing priorities assigned to guest operating systems 220 and user applications 222.

To implement selective enablement of branch prediction logic, data processing system 200 supports both hypervisor-mode and guest-mode control over the branch prediction logic, such that the guest-mode controls may be used to override any hypervisor-mode controls. In addition, in some embodiments, user-mode controls may be used to override any guest-mode and/or hypervisor-mode controls. In some embodiments, such controls may be applied to all guest operating systems and/or user applications such that, whenever a processor or processing core is executing any guest-mode/user-mode instructions, the guest-mode/user-mode controls are used to control the branch prediction logic, but the hypervisor-mode controls are used for hypervisor-mode instructions. Alternatively, guest-mode and/or user-mode controls may be tied to specific guest operating systems and/or user applications, such that, for example, each guest operating system and/or user application is permitted to control the branch prediction logic separate from other guest operating systems and/or user applications.

In addition, it may be desirable to permit a hypervisor and/or guest operating system to effectively "lock" the controls of any higher level software so that the ability for a guest operating system or user application to control the branch prediction logic may be disabled, either system wide or limited to particular guest operating systems and/or user applications.

In the illustrated embodiments, control over the selective enablement of branch prediction logic is implemented through control over an enable state of the branch prediction logic. When the enable state indicates that the branch prediction logic is enabled, the branch prediction logic is active and operating in a normal manner, while when the enable state indicates that the branch prediction logic is disabled, the branch prediction logic is essentially "turned off" so that the branch prediction logic does not attempt to predict the outcome of branch instructions, and typically, does not collect historical information based upon the monitored execution of one or more instruction streams being executed by a processor or processing core. For example, branch prediction logic that includes a branch history table may be configured to discontinue caching new entries in the branch history table or updating existing entries in the table.

Figure 6:
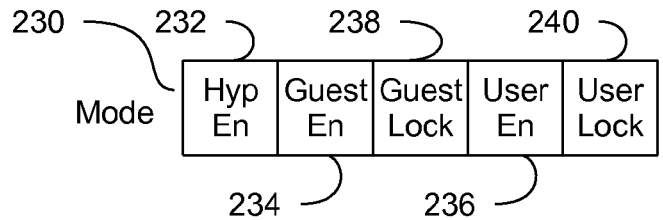
FIG. 6 is a block diagram of an exemplary enable mode control register in the special purpose registers referenced in FIG. 5.

The enable state of the branch prediction logic may be controlled, for example, using one or more hardware-based control registers that are accessed by the branch prediction logic to determine whether the branch prediction logic is currently active. FIG. 6, as an example, illustrates an exemplary enable mode control register 230 that includes a hypervisor enable field 232, guest enable field 234 and user enable field 236 that respectively control whether the branch prediction logic is active when executing hypervisor-mode, guest-mode and user-mode instructions. All three fields 232-236 are writeable by the hypervisor, while fields 234 and 236 are writeable by a guest operating system, and field 236 is writeable by a user application.

In addition, two lock fields, guest lock field 238 and user lock field 240 are used to disable the ability of a guest operating system (for field 238) or user application (for field 240) to write to the corresponding enable field 234, 236, and thus control the branch prediction logic. Typically, lock fields 238 and 240 are writeable by a hypervisor, and lock field 240 is writeable by a guest operating system, although both lock fields are readable by all levels so that, for example, a guest operating system or user application can check whether rights have been granted to control the branch prediction logic before an attempt is made to change the enable state of the logic.

It may be desirable in some applications to save and restore all or a portion of the state of control register 230 in connection with context switches, so that, for example, the enable states set by guest operating systems and/or user applications will be used only when instructions for those guest operating systems and/or user applications are being executed, thereby supporting the ability to have each guest operating system and/or user application.

Figure 7:
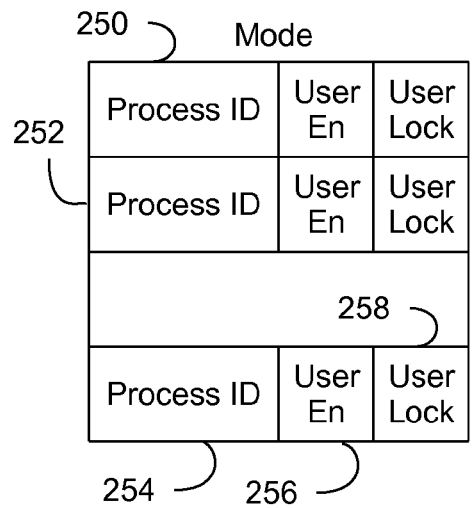
FIG. 7 is a block diagram of an exemplary process-specific enable mode data structure capable of being used in the data processing system of FIG. 5.

Alternatively, as shown in FIG. 7, it may be desirable to use a data structure such as a process-specific enable mode table 250 that includes a plurality of entries 252 that tie a process identifier 254 to user enable and lock fields 256, 258 that enable process-specific customization of branch prediction logic. Table 250 may be managed by a hypervisor or guest operating system to configure what processes, and what applications in those processes, are able to control the branch prediction logic, and to permit or restrict those processes from selectively enabling and disabling the branch prediction logic while executing the respective processes. A similar data structure may also be used in some embodiments to provide guest-specific control over multiple guest operating systems.

Figure 8:
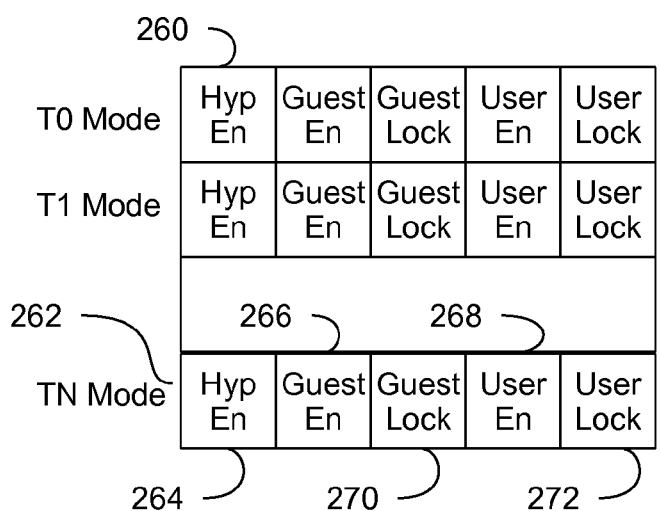
FIG. 8 is a block diagram of an exemplary thread-specific enable mode data structure capable of being used in the data processing system of FIG. 5.

In addition, as noted above, branch prediction logic may be shared by multiple hardware threads executing in a given processor core, and in the embodiments illustrated in FIGS. 6-7, control over branch prediction logic will typically affect all hardware threads utilizing the branch prediction logic in a given processing core. Alternatively, as illustrated in FIG. 8, a thread-specific enable mode data structure such as a table 260 may include separate entries 262 associated with different threads and including separate hypervisor, guest and user enable fields 264, 266, 268 and guest and user lock fields 270, 272 for each hardware thread such that different enable states may be set for different hardware threads. The branch prediction logic may then be configured to access table 260 to determine whether the logic should be active when executing instructions associated with a particular hardware thread that is currently mapped to a given virtual thread.

As another alternative, the enable control data structures may be virtualized and associated with particular virtual threads such that, whenever a particular virtual thread is being executed by a given hardware thread, the enable controls associated with that virtual thread will be used for that virtual thread. For example, a virtual thread-specific control register may be loaded into a hardware-based control register for a processing core that is assigned to execute such virtual thread during a context switch to that virtual thread so that the branch prediction logic in the processing core is configured to operate in a manner specified by the virtual thread.

Figure 9:
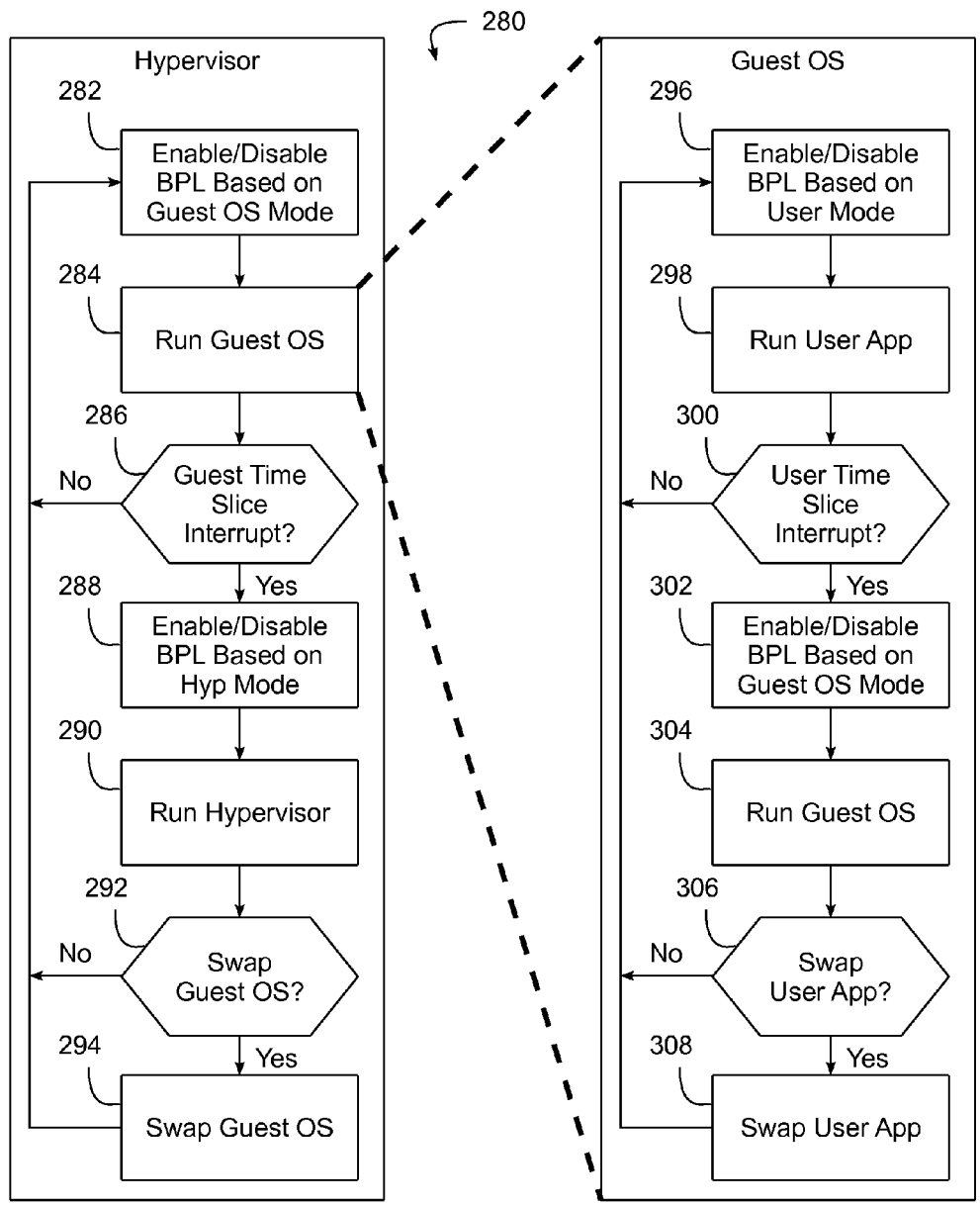
FIG. 9 is a flowchart illustrating an exemplary sequence of operations performed by the data processing system of FIG. 5 when performing context switches between hypervisor, guest operating system and user mode program code with selectively enabled brand prediction logic.

Regardless of how the enable state-related control data is maintained, the branch prediction logic may be selectively enabled during operation of a data processing system in the general manner illustrated by sequence of operations 280 of FIG. 9, which illustrates the general execution of a single hardware thread in a data processing system. It will be appreciated that other hardware threads resident in a data processing system may be executed in a similar manner.

At the hypervisor level, execution periodically switches between the hypervisor and one or more guest operating systems, as illustrated in blocks 282-294. Specifically, block 282 enables or disables the branch prediction logic based upon the enable state for the guest operating system about to be executed by the thread. It will be appreciated that this enable state may be designated by the guest operating system, or may be designated by the hypervisor, either due to the guest operating system being locked from setting the enable state, or due to the guest operating system having not overridden a default state set by the hypervisor.

Once the branch prediction logic has been selectively enabled or disabled, the guest operating system is run or executed (block 284) for some period of time such that the branch prediction logic will be enabled or disabled based upon the enable state for the guest operating system currently being executed. Execution continues until either a preemptive interrupt, or as shown in block 286, until the guest operating system has completed its assigned time slice, whereby control passes to block 288 to enable or disable the branch prediction logic based upon the enable state for the hypervisor. The hypervisor is then run or executed for some period of time (block 290), and a determination is made in block 292 as to whether to return to executing the last guest operating system or to swap in another guest operating system. If a decision is made to swap in another guest operating system, control passes to block 294 to perform the swap, and then back to block 282 to execute the new guest operating system using the enable state for the new guest operating system. Otherwise, block 292 returns control to block 282 to continue executing the current guest operating system using the enable state for the current guest operating system.

At the guest operating system level, context switches are periodically performed between the guest operating system and one or more user applications, as illustrated in blocks 296-308. Specifically, block 296 enables or disables the branch prediction logic based upon the enable state for the user application about to be executed by the thread. It will be appreciated that this enable state may be designated by the user application, or may be designated by the hypervisor or guest operating system, either due to the user application being locked from setting the enable state, or due to the user application having not overridden a default state set by the hypervisor or the guest operating system.

Once the branch prediction logic has been selectively enabled or disabled, the user application is run or executed (block 298) for some period of time such that the branch prediction logic will be enabled or disabled based upon the enable state for the user application currently being executed. Execution continues until either a preemptive interrupt, or as shown in block 300, until the user application has completed its assigned time slice, whereby control passes to block 302 to enable or disable the branch prediction logic based upon the enable state for the guest operating system. The guest operating system is then run or executed for some period of time (block 304), and a determination is made in block 306 as to whether to return to executing the last user application or to swap in another user application. If a decision is made to swap in another user application, control passes to block 308 to perform the swap, and then back to block 296 to execute the new user application using the enable state for the new user application. Otherwise, block 306 returns control to block 296 to continue executing the current user application using the enable state for the current user application.

Therefore, in embodiments consistent with the invention, if an application developer recognizes that certain sections of an application under development, or the entire application, tends to corrupt the branch prediction logic with useless historical information, e.g., due to the random and non-predictable nature of the workload, the developer can configure the application to selectively disable the branch prediction logic for the application or for any problematic sections thereof, and avoid corrupting the branch prediction logic, leading to improved branch prediction for the other sections of the application as well as any other programs that might use the branch prediction logic. Likewise, if a guest operating system is aware of certain applications or types of applications that do not work well with branch prediction logic enabled, or if a hypervisor is aware of certain applications or guest operating systems that do not work well with branch prediction, the guest operating system and/or hypervisor may selectively disable branch prediction logic when executing those incompatible programs.

Next, in the illustrated embodiments, control over saving and restoring the state of branch prediction logic is implemented through the use of hypervisor-mode as well as guest-mode and/or use-mode instructions, e.g., via move instructions between addressable registers in the branch prediction logic, or one or more ports provided by the branch prediction and a memory or other buffer capable of storing cached state information. For example, in some embodiments, software may provide a memory address in an SPR and then write a kick-off bit (e.g., one bit for save, one bit for restore) to inform a microcode unit or hardware assist sequencer to save/restore the data to/from the provided memory address. In some embodiments, the same SPR's that hold the address and kick-off bits may be protected by the aforementioned hypervisor/guest/user mechanism for setting the enable state. In addition, if no hardware assist sequencer is used, software instructions may perform save and restore operations by looping between instructions that set a memory address, write a kick-off bit, and increment the address until all data has been transferred.

Figure 10:
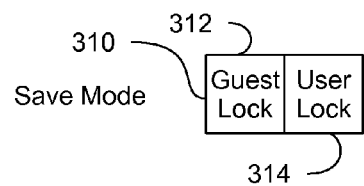
FIG. 10 is a block diagram of an exemplary save mode control register in the special purpose registers referenced in FIG. 5.

In some embodiments, e.g., as illustrated in FIG. 10, a save mode control register 310, including lock fields 312, 314 for guest-mode and user-mode instructions, may be used to selectively enable guest operating systems and/or user applications or processes to save and/or restore branch prediction logic state data. As with enable/disable functionality, enabling save/restore functionality may apply to all guest operating systems and/or user applications, or may be specific to particular guest operating systems, user applications and/or user processes in some embodiments consistent with the invention.

Figure 11:
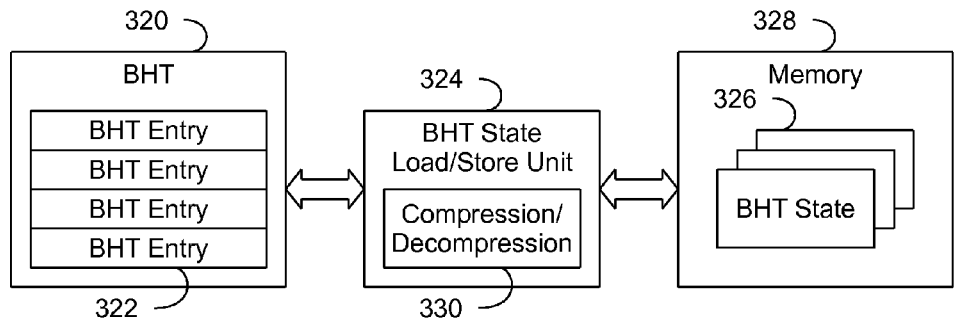
FIG. 11 is a block diagram of an exemplary state load/store unit capable of being used in the data processing system of FIG. 5 to save and restore branch prediction logic state data.

In addition, as noted above implementation of save and restore operations may be implemented primarily in software, e.g., via loops of move instructions, or alternatively, may rely on dedicated logic in or otherwise coupled to the branch prediction logic to accelerate save and store operations. For example, FIG. 11 illustrates an exemplary branch history table 320 including a plurality of entries 322 and coupled to a branch history table load/store unit 324. Load/store unit 324 may be used, for example, to copy one or more entries 322 from branch history table 320 as state data 326 in a memory 328, as well as restore branch history table 320 by copying entries in state data 326 back into branch history table 320.

Multiple state data 326 copies may be maintained in memory 328, e.g., based upon different user applications, different guest operating systems, etc. Memory 328 may be part of the main memory architecture of a data processing system, or may be a dedicated buffer, e.g., a dedicated buffer in a processing core, in some implementations. Load/store unit 324 may be implemented, for example, as a sequencer or microcode unit that is responsive to input data provided by a thread to initiate a transfer of selected data between branch history table 320 memory 328.

In some implementations, the entire branch history table, and optionally including other state data for branch prediction logic, may be saved/restored as state data. In some embodiments, however, it may be desirable to only save/restore a subset of the data representing the state of the branch prediction logic, e.g., to skip entries 322 that are marked as invalid, or to save only the N most used or most recently used entries. In addition, as illustrate by compression/decompression engine 330 in load/store unit 324, it may be desirable in some embodiments to compress the state data in memory 328 to reduce the amount of storage required to maintain the state data, and then decompress the compressed data as it is being restored back into the branch prediction logic. Other hardware-based manners of accelerating or otherwise reducing the performance impact of saving and restoring the state data of the branch prediction logic may be used in the alternative.

Figure 12:
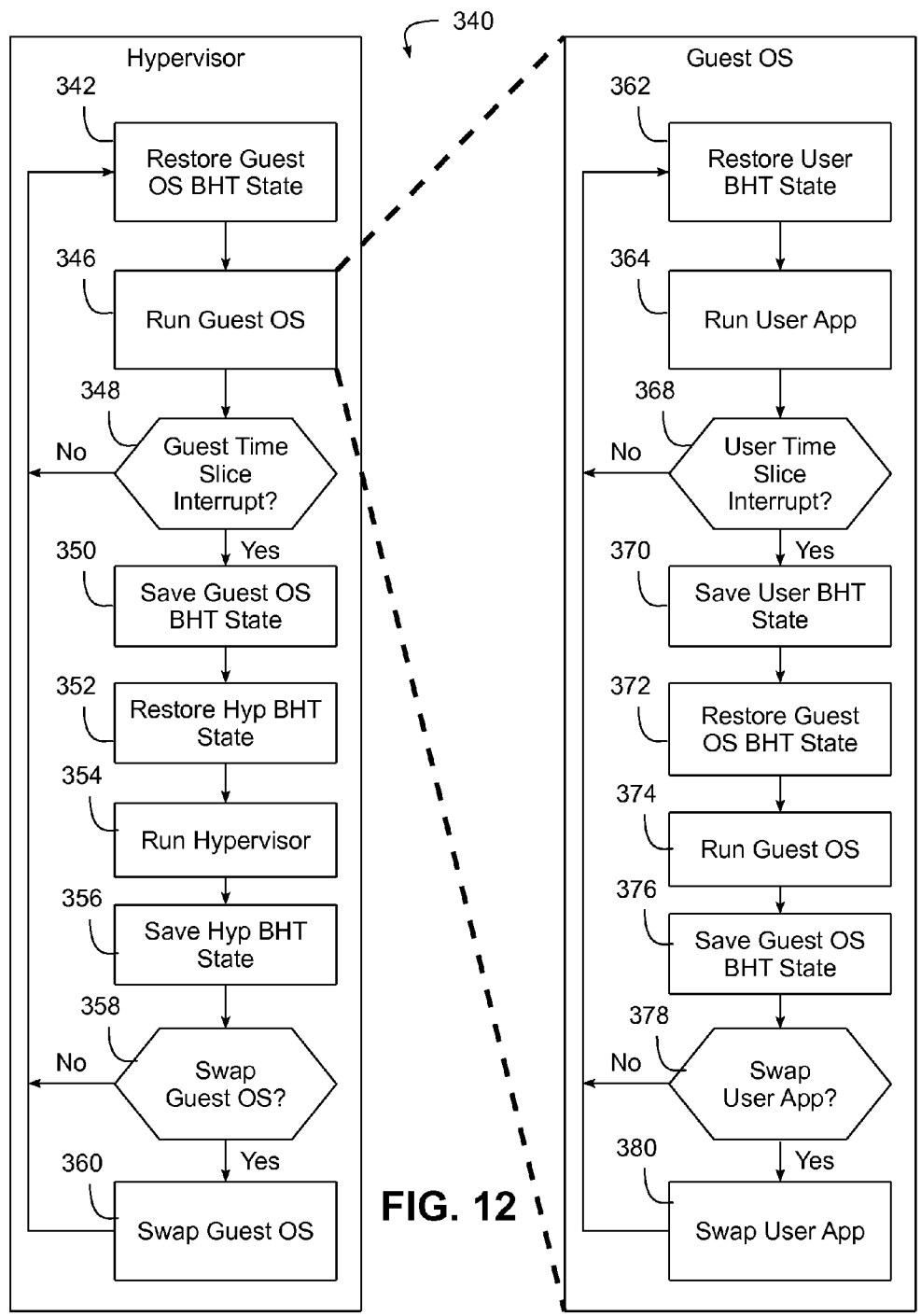
FIG. 12 is a flowchart illustrating an exemplary sequence of operations performed by the data processing system of FIG. 5 when performing context switches between hypervisor, guest operating system and user mode program code with save and restore of brand prediction logic state.

Regardless of how the branch prediction logic state data is saved and restored, FIG. 12 illustrates a sequence of operations 340 suitable for the general execution of a single hardware thread in a data processing system in connection with saving and restoring branch prediction logic state data. It will be appreciated that other hardware threads resident in a data processing system may be executed in a similar manner.

At the hypervisor level, execution periodically switches between the hypervisor and one or more guest operating systems, as illustrated in blocks 342-360. Specifically, block 342 restores, e.g., in response to a guest-mode instruction in the guest operating system, stored branch prediction logic state data for the guest operating system. Once the branch prediction logic state has been restored, the guest operating system is run or executed (block 346) for some period of time such that the branch prediction logic will use the restored state while the guest operating system is being executed. Execution continues until either a preemptive interrupt, or as shown in block 348, until the guest operating system has completed its assigned time slice, whereby control passes to block 350 to save the state of the branch prediction logic, e.g., in response to a guest-mode instruction in the guest operating system. Next, block 352 restores, e.g., in response to a hypervisor-mode instruction in the hypervisor, stored branch prediction logic state for the hypervisor. The hypervisor is then run or executed for some period of time (block 354), and thereafter block 356 saves the state of the branch prediction logic, e.g., in response to a hypervisor-mode instruction in the hypervisor. Next, a determination is made in block 358 as to whether to return to executing the last guest operating system or to swap in another guest operating system. If a decision is made to swap in another guest operating system, control passes to block 360 to perform the swap, and then back to block 342 to restore the branch prediction logic state for the guest operating system. Otherwise, block 358 returns control to block 342 to restore the branch prediction logic state for the guest operating system.

At the guest operating system level, context switches are periodically performed between the guest operating system and one or more user applications, as illustrated in blocks 362-380. Specifically, block 362 restores, e.g., in response to a user-mode instruction in the user application, stored branch prediction logic state data for the user application. Once the branch prediction logic state has been restored, the user application is run or executed (block 364) for some period of time such that the branch prediction logic will use the restored state while the user application is being executed. Execution continues until either a preemptive interrupt, or as shown in block 368, until the user application has completed its assigned time slice, whereby control passes to block 370 to save the state of the branch prediction logic, e.g., in response to a user-mode instruction in the user application. Next, block 372 restores, e.g., in response to a guest-mode instruction in the guest operating system, stored branch prediction logic state for the guest operating system. The guest operating system is then run or executed for some period of time (block 374), and thereafter block 376 saves the state of the branch prediction logic, e.g., in response to a guest-mode instruction in the guest operating system. Next, a determination is made in block 378 as to whether to return to executing the last user application or to swap in another user application. If a decision is made to swap in another user application, control passes to block 380 to perform the swap, and then back to block 362 to restore the branch prediction logic state for the user application. Otherwise, block 378 returns control to block 362 to restore the branch prediction logic state for the user application.

It will be appreciated the instructions to save and/or restore branch prediction logic state data may be implemented within context switch routines executed to save or restore other state data associated with a given context being executed by a hardware thread. In addition, it will be appreciated that the hypervisor, selected guest operating systems and/or selected user applications may have no need to save or restore branch prediction logic state data, so these selected entities may omit the execution of any instructions during context switches to either save or restore branch prediction logic data for such entities.

Figure 13:
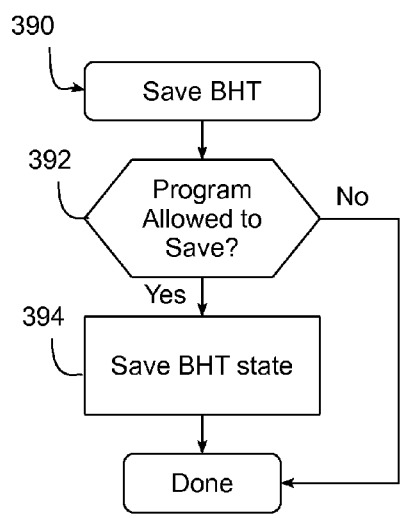
FIG. 13 is a flowchart illustrating an exemplary sequence of operations performed to save branch prediction logic state as referenced in FIG. 12.
Figure 14:
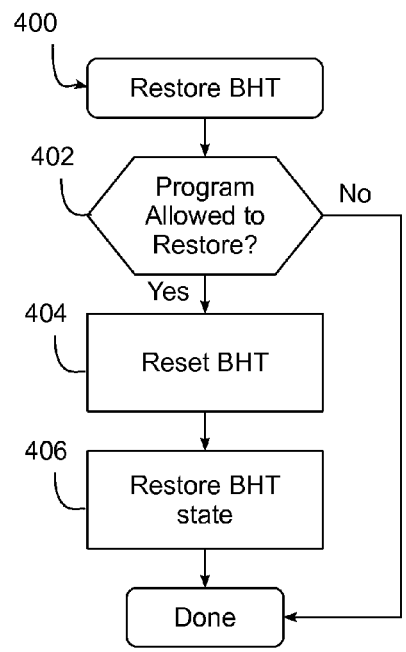
FIG. 14 is a flowchart illustrating an exemplary sequence of operations performed to restore branch prediction logic state as referenced in FIG. 12.

FIGS. 13-14 illustrate in greater detail the operations that occur in connection with saving and restoring branch prediction logic state table, e.g., branch history table entries. FIG. 13, for example, illustrates a save branch history table routine 390 that is executed by a program, e.g., a hypervisor, a guest operating system and/or user application, to save branch prediction logic state data. Block 392, for example, first determines whether the program is allowed to save the branch prediction logic state, e.g., by checking an associated lock field for the program. In some instances, e.g., for a hypervisor, the program may always be entitled to save branch prediction logic state, so block 392 may be omitted. If not permitted by block 392, routine 390 is terminated. Otherwise, block 392 passes control to block 394 to save the branch prediction logic state, and routine 390 is complete.

Similarly, FIG. 14 illustrates a restore branch history table routine 400 that is executed by a program, e.g., a hypervisor, a guest operating system and/or user application, to restore branch prediction logic state data. Block 402, for example, first determines whether the program is allowed to restore the branch prediction logic state, e.g., by checking an associated lock field for the program. In some instances, e.g., for a hypervisor, the program may always be entitled to restore branch prediction logic state, so block 402 may be omitted. If not permitted by block 402, routine 390 is terminated. Otherwise, block 402 passes control to block 404 to reset the branch prediction logic state, e.g., by clearing out all old branch history table entries, and then to block 406 to restore the branch prediction logic state. Routine 400 is then complete.

Therefore, embodiments consistent with the invention allow for finer grained control of branch prediction logic, through selective enablement/disablement and/or selective saving and restoring of branch prediction logic state data. It is believed that in many embodiments, the provision of finer grained control enables branch prediction logic to be better optimized for different types of programs and workloads, and in some instances, may allow smaller and/or less complex branch prediction logic to be used, thereby saving cost and reducing the amount of space consumed by the branch prediction logic on a processor chip.

Various modifications may be made to the disclosed embodiments without departing from the spirit and scope of the invention. Therefore, the invention lies in the claims hereinafter appended.

What is claimed is:

1. A method of controlling branch prediction logic in a data processing system, the method comprising:
  saving a first state of branch prediction logic in a processing core in response to a first hypervisor-mode instruction executed by the processing core for a hypervisor resident in the data processing system, wherein saving the first state of the branch prediction logic is performed in association with a context switch away from the hypervisor;
  restoring the first state of the branch prediction logic in response to a second hypervisor-mode instruction executed by the processing core for the hypervisor, wherein restoring the first state of the branch prediction is performed in association with a context switch to the hypervisor;
  saving a second state of the branch prediction logic in response to a third guest-mode or user-mode instruction executed by the processing core for a program hosted by the hypervisor, wherein the program is a guest operating system or a user process, and wherein saving the second state of the branch prediction logic is performed in association with a context switch away from the program; and
  restoring the second state of the branch prediction logic in response to a fourth guest-mode or user-mode instruction executed by the processing core for the program hosted by the hypervisor, wherein restoring the second state of the branch prediction is performed in association with a context switch to the program.

2. The method of claim 1, wherein the branch prediction logic is configured to cache branch prediction data in a branch prediction table, wherein saving the first state of the branch prediction logic comprises saving at least one entry in the branch prediction table, and wherein restoring the first state of the branch prediction logic comprises storing the at least one entry into the branch prediction table.

3. The method of claim 2, wherein saving the first state comprises saving only a subset of the entries in the branch prediction table based upon frequency of use.

4. The method of claim 2, wherein saving the first state comprises saving only valid entries in the branch prediction table.

5. The method of claim 1, wherein saving the first state comprises compressing data associated with the first state and storing the compressed data into a memory, and wherein restoring the first state comprises decompressing the compressed data in the memory.

6. The method of claim 1, wherein saving the first state includes causing hardware logic in the processing core to save the first state.

7. The method of claim 6, wherein the hardware logic comprises microcode logic.

8. The method of claim 1, wherein the program comprises a guest operating system hosted by the hypervisor, wherein the third and fourth instructions are guest-mode instructions.

9. The method of claim 1, wherein the program comprises a user process hosted by the hypervisor, wherein the third and fourth instructions are user-mode instructions.

10. The method of claim 9, wherein the user process is hosted by a guest operating system hosted by the hypervisor.

11. The method of claim 1, further comprising resetting a state of the branch prediction logic in response to a fifth hypervisor-mode instruction executed by the processing core for the hypervisor.

12. The method of claim 1, further comprising, with the hypervisor, selectively disabling the program from saving or restoring a state of the branch prediction logic.

13. The method of claim 1, further comprising executing a second program hosted by the hypervisor without saving and restoring a state of the branch prediction logic.

14. A circuit arrangement, comprising:
  a processing core; and
  branch prediction logic disposed in the processing core;
  wherein the processing core is configured to save a first state of the branch prediction logic in response to a first hypervisor-mode instruction executed by the processing core for a hypervisor resident in the data processing system, restore the first state of the branch prediction logic in response to a second hypervisor-mode instruction executed by the processing core for the hypervisor, save a second state of the branch prediction logic in response to a third guest-mode or user-mode instruction executed by the processing core for a program hosted by the hypervisor, and restore the second state of the branch prediction logic in response to a fourth guest-mode or user-mode instruction executed by the processing core for the program hosted by the hypervisor, wherein the program is a guest operating system or a user process, wherein the processing core is configured to save the first state of the branch prediction logic in association with a context switch away from the hypervisor, and restore the first state of the branch prediction in association with a context switch to the hypervisor, and wherein the processing core is configured to save the second state of the branch prediction logic in association with a context switch away from the program, and restore the second state of the branch prediction in association with a context switch to the program.

15. The circuit arrangement of claim 14, wherein the branch prediction logic is configured to cache branch prediction data in a branch prediction table, wherein the processing core is configured to save the first state of the branch prediction logic by saving at least one entry in the branch prediction table, and wherein the processing core is configured to restore the first state of the branch prediction logic by storing the at least one entry in into the branch prediction table.

16. The circuit arrangement of claim 14, wherein the program comprises a guest operating system hosted by the hypervisor, wherein the third and fourth instructions are guest-mode instructions.

17. The circuit arrangement of claim 14, wherein the program comprises a user process hosted by the hypervisor, wherein the third and fourth instructions are user-mode instructions.

18. The circuit arrangement of claim 17, wherein the user process is hosted by a guest operating system hosted by the hypervisor.

19. The circuit arrangement of claim 14, wherein the processing core is configured to reset a state of the branch prediction logic in response to a fifth hypervisor-mode instruction executed by the processing core for the hypervisor.

20. The circuit arrangement of claim 14, wherein the processing core is configured to, in response to the hypervisor, selectively disable the program from saving or restoring a state of the branch prediction logic.

21. The circuit arrangement of claim 14, wherein the processing core is configured to execute a second program hosted by the hypervisor without saving and restoring a state of the branch prediction logic.

22. A program product, comprising:
a non-transitory computer readable storage medium; and
program code stored on the non-transitory computer readable storage medium, the program code including a first hypervisor-mode instruction configured to be executed by a processing core to save a first state of branch prediction logic in the processing core, a second hypervisor-mode instruction configured to be executed by the processing core to restore the first state of the branch prediction logic, a third guest-mode or user-mode instruction for a program hosted by the hypervisor and configured to be executed by the processing core to save a second state of the branch prediction logic, and a fourth guest-mode or user-mode instruction for the program hosted by the hypervisor and configured to be executed by the processing core to restore the second state of the branch prediction logic, wherein the program is a guest operating system or a user process, wherein the program code is configured to save the first state of the branch prediction logic in association with a context switch away from the hypervisor, and restore the first state of the branch prediction in association with a context switch to the hypervisor, and wherein the program code is configured to save the second state of the branch prediction logic in association with a context switch away from the program, and restore the second state of the branch prediction in association with a context switch to the program.

23. The program product of claim 22, wherein the program code is configured to execute a second program hosted by the hypervisor without saving and restoring a state of the branch prediction logic.

\* \* \* \* \*